United States Patent [19]

Montague et al.

[11] Patent Number: 5,382,644

[45] Date of Patent: Jan. 17, 1995

[54] LINEAR POLYPHOSPHAZENES AND A PROCESS FOR THEIR PRODUCTION

[75] Inventors: Robert A. Montague, Allison Park; Krzysztof Matyjaszewski, Pittsburgh, both of Pa.

[73] Assignee: Carnegie Mellon University, Pittsburgh, Pa.

[21] Appl. No.: 927,701

[22] Filed: Aug. 10, 1992

Related U.S. Application Data

[63] Continuation-in-part of Ser. No. 533,564, Jun. 5, 1990, Pat. No. 5,138,008.

[30] Foreign Application Priority Data

Apr. 6, 1991 [WO] WIPO ............................... 91/03,920

[51] Int. Cl.$^6$ ............................................. C08G 77/22
[52] U.S. Cl. .......................................... 528/30; 528/21; 528/23; 528/399
[58] Field of Search ....................... 528/21, 23, 30, 399

[56] References Cited

U.S. PATENT DOCUMENTS

5,101,002  3/1992  Klobucar et al. ..................... 528/399
5,138,008  8/1992  Montague et al. ..................... 528/21

FOREIGN PATENT DOCUMENTS

0286709 10/1988  European Pat. Off. .

OTHER PUBLICATIONS

Allock, "Developments At The Interface of Inorganic Organic, and Polymer Chemistry", Chemical & Eng. News vol. 63, pp. 22–36 1985.
Allock et al "JACS" vol. 87 pp. 4216–4217 1965.
Allock, "Chemical Review" vol. 87 pp. 315–356 1972.
Allock et al "Macromolecules" vol. 13, pp. 201–207 1980.
Wisian–Neilson, et al "Inorganic Chemistry", vol. 19 pp. 1875–1878 1980.
Neilson et al, "J. Marcromol. Sci–Chem.", vol. -A16 pp. 425–439 1981.
Neilson et al "Macromolecules" vol. 20, pp. 910–916, 1987.
Flint et al, "Z. anorg. allg. Chem. " vol. 428, pp. 204–208 1977.
Sennett et al "Macromolecules" vol. 19, pp. 959–964, 1986.
Mujumdar et al "Macromolecules" vol. 23, pp. 14–21 1990.
Austin et al. "Macromolecules" vol. 16, pp. 719–721, 1983.

*Primary Examiner*—Melvyn L. Marquis
*Attorney, Agent, or Firm*—Reed Smith Shaw & McClay

[57] ABSTRACT

Polyphosphazenes are produced by polymerizing a silylated phosphinimine in the presence of an initiator, preferably an anionic initiator at temperatures below those typically necessary for such polymerization reactions. The polyphosphazenes obtained are suitable for use in the production of elastomeric and thermoplastic materials.

20 Claims, 2 Drawing Sheets

LINEAR POLYPHOSPHAZENES AND A PROCESS FOR THEIR PRODUCTION

CROSS-REFERENCE TO RELATED APPLICATION

This application is a continuation-in-part of PCT US91/03920, filed Apr. 6, 1991 which is a continuation of U.S. application Ser. No. 07/533,564, filed on Jun. 5, 1990, now U.S. Pat. No. 5,138,008, issued Aug. 11, 1992.

BACKGROUND OF THE INVENTION

The present invention relates to substantially linear polyphosphazenes and to a process for their production.

Polyphosphazenes are inorganic macromolecules having backbones made up of alternating phosphorus and nitrogen atoms. The physical and chemical properties of polymeric phosphazenes may be varied by changing the substituents attached to the phosphorus atoms in the backbone. For example, Allcock discloses in "Developments at the Interface of Inorganic, Organic, and Polymer Chemistry", *Chemical and Enqineering News*, Vol. 63, pages 22–36 (1985) that inclusion of methoxy, ethoxy and/or mixtures of groups such as $CF_3CH_2O$ or $HCF_2CF_2CH_2O$ groups as the substituents attached to phosphorus atoms in the backbone of the polyphosphazene produce polyphosphazenes having improved low temperature flexibility. Inclusion of fluoroalkoxy side groups on the backbone produce polyphosphazenes having surface hydrophobicity and solvent resistance. Most polyphosphazenes having such side groups are also said to resist burning and oxidative breakdown better than many single strand organic polymers and to be stable with respect to water and a wide range of other chemical agents.

There are two main approaches to making polyphosphazenes which are currently being used. In the first, halogenated cyclotriphosphazenes are first heated to open the ring and then polymerized. The halogen substituents are subsequently replaced by hydrolytically stable groups. Typical examples of this process are given in Allcock, et al, *JACS*, Vol. 87, pages 4216–4217 (1965); Allcock, *Chemical Review*, Volume 72, pages 315–356 (1972); and Allcock, et al, *Macromolecules*, Volume 13, pages 201–207 (1980).

In the second approach to making polyphosphazenes, substituted phosphinimines are condensed, Such condensation processes are disclosed by Wisian-Neilson, et al, *Inorganic Chemistry*, Volume 19, pages 1875–1878 (1980); Nellson, et al, *J. Macromol. Sci.-Chem.*, Volume A16(1), pages 425–439 (1981) and Neilson, et al, *Macromolecules*, Volume 20, pages 910–916 (1987).

The condensation of substituted phosphinimines provides a route to a variety of polyalkylphosphazenes and polyarylphosphazenes in addition to the known polyalkoxy-, polyaryloxy- and polyamino-phosphazenes. However, these condensation reactions involve long reaction times (e.g., 2–12 days) and high temperatures (typically 160°–220° C) before the desired polymer is obtained. These thermally driven condensation reactions also provide little control over the product's ultimate molecular weight and molecular weight distribution. Additionally, it would be expected that the high reaction temperatures used in these processes would lead to undesirable side reactions.

Polyphosphazenes such as poly[bis(2,2,2-trifluoroethoxy)phosphazene] may be prepared by either the ring opening/halogen substitution method or by condensation of the phosphinimine obtained by reaction of trimethylsilylazide with tris(2,2,2-trifluoroethyl) phosphite. Flindt, et al discloses an appropriate procedure for the condensation reaction in *Z. Anorg. Allg. Chem.*, Vol. 428, pages 204–208 (1977). The polymerization step in the Flindt, et al process was carried out without a catalyst. Consequently, polymerization required a reaction time of approximately 48 hours at a temperature of approximately 200° C.

It has been demonstrated by Sennett, et al (See Sennett, et al, *Macromolecules*, Volume 19, pages 959–964 (1986) that Lewis acids such as boron trichloride catalyze the ring opening polymerization of cyclohalophosphazenes. Mujumdar, et al have also reported in *Macromolecules*, Vol. 23, pages 14–21 (1990) that protonic acids such as toluenesulfonic acid, sulfobenzoic acid and sulfamic acid catalyze the ring opening polymerization of cyclohalophosphazenes. However, no material which effectively catalyzes polymerization of phosphinimine monomers has been found in the literature.

SUMMARY OF THE INVENTION

It is an object of the present invention to provide novel polyphosphazenes.

It is also an object of the present invention to provide a relatively simple and economical process for producing polyphosphazenes.

It is another object of the present invention to provide a process for making polyphosphazenes which may be carried out on a commercial scale.

It is a further object of the present invention to provide linear polyphosphazenes having a controlled molecular weight and molecular weight distribution and is thus easier to ship and process than known polyphosphazenes.

These and other objects which will be apparent to those skilled in the art are accomplished by polymerizing a P-trisubstituted-N-(silylated) phosphinimine in the presence of an initiator, preferably an anionic initiator. A preferred anionic initiator is tetra-alkyl ammonium halide. This polymerization reaction may be carried out at temperatures below 200° C. An organic solvent may be included in the reaction mixture but is not required. The polyphosphazene thus obtained is frequently in powder form and may be processed in accordance with known techniques to produce elastomeric and thermoplastic materials having improved mechanical properties. The polymerization of a phosphinimine in the presence of an anionic initiator may also be used to produce known polyphosphazenes from known phosphinimines in a particularly advantageous manner.

DETAILED DESCRIPTION OF THE PREFERRED EMBODIMENTS OF THE PRESENT INVENTION

Figure 1:
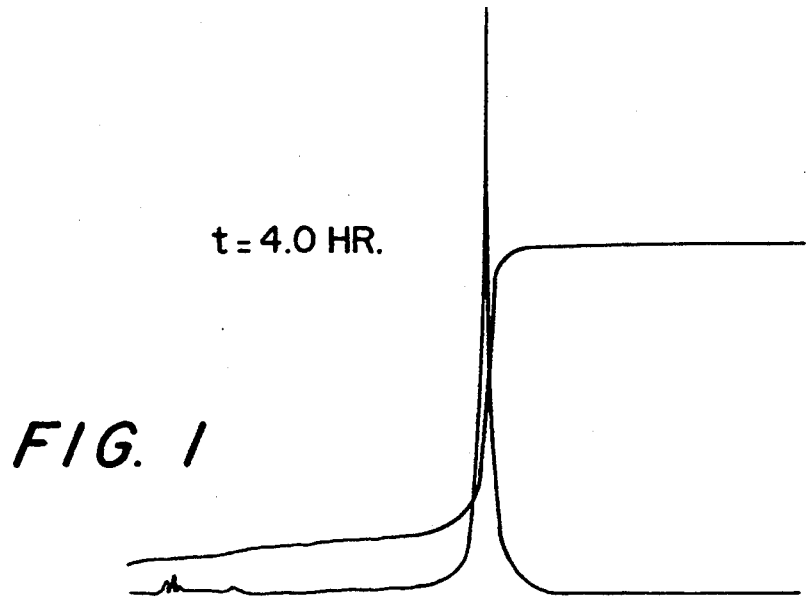
FIGS. 1, 2 and 3 are $^{31}$P NMR spectra for the polymerization mixture taken at the specified time intervals during the polymerization reaction of Example 2.

The present invention relates to polyphosphazenes, particularly poly[bis(halosubstituted) phosphazenes] and to a process for their production. These polyphosphazenes are made by polymerizing a P-trisubstituted-N-(silylated) phosphinimine in the presence of an initiator. The polymerization of such phosphinimines in the presence of the anionic initiators under the conditions of the present invention may also be used to produce known and novel polyphosphazenes in a simpler and more economically advantageous manner.

The P-trisubstituted-N-(silylated) phosphinimines from which the polymeric phosphazenes of the present invention are produced are known materials. P-trisubstituted-N-silylated phosphinimines represented by the formula $(R)_3P=N—Si(R')_3$ in which each R group independently represents a linear or branched alkyl group, a linear or branched alkoxy group, an alkylene group, an aryl group, an aryloxy group, an arylalkyl group having linear and/or branched alkyl groups or an arylalkoxy group in which the alkoxy portion may be linear or branched, provided that at least one R group is a leaving group, preferably an electron withdrawing group are preferred. Alkoxy and aryloxy groups are the preferred leaving groups. Specific examples of appropriate leaving groups include —$OCH_2CF_3$ and O-phenyl groups. Each R' (which may be the same or different) represents an alkyl group having from 1 to about 8 carbon atoms which is preferably linear. These phosphinimines may be produced by the process disclosed by Flindt, et al, *Z. Anorg. Allg. Chem.*, Volume 428, pages 204–208 (1977) or by any of the techniques known to those skilled in the art. Neilson et al disclose specific examples of such phosphinimines in *Macromolecules*, Volume 20, pages 910–916 (1987). Specific examples of suitable phosphinimines are P-tris(2,2,2-trifluoroethoxy)-N-(trimethylsilyl)phosphinimine and P-tris(phenoxy)-N-(trimethylsilyl)-phosphinimine.

The R substituents bonded to the phosphorus atom and the R' substituents bonded to the silicon atom of the phosphinimine need not be the same. Mixtures of P-trisubstituted-N-(silylated) phosphinimines may, of course, also be polymerized in accordance with the process of the present invention to produce copolymers.

The initiator used in the practice of the present invention is a key feature of the invention because in the absence of such an initiator the phosphinimine monomer would autopolymerize very slowly by an unknown mechanism. Consequently, any attempt to polymerize N-silyl-phosphinimine monomers in the absence of the initiator would require an extended reaction time before a polymer was obtained. Further, such autopolymerization would make it difficult, if not impossible, to control the ultimate molecular weight of the product polymer in the manner achieved by use of the initiator required in the present invention.

The initiator used in the practice of the present invention may be any compound capable of cleaving the silyl group of the monomer starting material and of producing a counterion capable of stabilizing the active ends of the monomer and growing chains. Anionic initiators are preferred. Quaternary ammonium compounds such as tetra-substituted ammonium hydroxide and tetra-substituted ammonium halides are examples of suitable initiators. Halides are the preferred anionic initiators with fluorides being the most preferred. Other examples of such compounds which may be used as anionic initiators include: tetra-alkyl ammonium halides, tetra-alkyl phosphonium halides, tetra-aralkyl ammonium halides, tetra-aralkyl phosphonium halides, tetra-substituted ammonium halides in which one or more of the substituents is aromatic, tetra-substituted phosphonium halides in which one or more of the substituents is aromatic. Tetraalkyl ammonium halides are particularly preferred. The anionic initiator which has been found to be particularly advantageous in producing the polyphosphazenes of the present invention is tetra-n-butyl ammonium fluoride.

It has been found that the relative concentration of the initiator affects the molecular weight of the polymer. The initiator is generally included in the polymerization mixture of the present invention in a concentration of no more than about 10% by weight, unless an additive or impurity known to limit molecular weight in polymerization reactions is present in the polymerization mixture. The initiator is preferably used in a quantity such that it constitutes from 0.01 to about 5.0% of the total polymerization mixture by weight. Concentrations of greater than 10% are not recommended for commercial reasons but they may, of course, be employed in the process of the present invention. The optimum concentration of initiator will depend upon the desired molecular weight of the product polymer, the desired reaction time and temperature and upon whether chain transfer agents or endcapping agents are present in the polymerization mixture.

The polymerization of the present invention may be carried out in the presence of an organic solvent but such solvents are not required. Suitable solvents include ethers, N-substituted amides, nitriles, pyrrolidones, dioxanes and sulfoxides. Diethylene glycol dimethyl ether, dimethyl formamide, acetonitrile, methyl pyrrolidone, diphenyl ether and dimethylsulfoxide are among the preferred solvents.

The polymerization of the present invention may be carried out at temperatures which are significantly lower than the temperatures used in other processes for the production of polyphosphazenes. More specifically, the polymerization of the present invention may be carried out at temperatures below about 200° C., preferably below about 175° C., more preferably from about 25° to about 150° C. and most preferably at a temperature of about 100° C.

The polyphosphazenes of the present invention may generally be recovered from the reaction mixture quite readily by known techniques. The polyphosphazenes of the present invention may often be recovered in the form of a powder and in some cases as a white powder. It is believed that these polymers may be represented by the formula

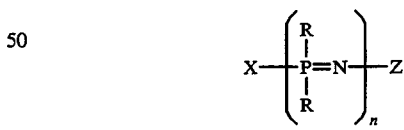

in which
X represents a fluoroalkoxy group or an end group of a chain transfer agent,
each R (which may be the same or different) represents an alkyl group which may be linear or branched, a linear or branched alkoxy group, an alkylene group, an aryl group, an aryloxy group, an arylalkyl group in which the alkyl group may be linear or branched or an arylalkoxy group in which the alkoxy portion may be linear or branched, preferably a linear alkyl or alkoxy group having from about 1 to about 24 carbon atoms, most preferably a linear alkyl or alkoxy group having from about 2 to about 8 carbon atoms, Z represents the counterion derived from the initiator, preferably a tetra-alkyl substituted ammonium ion, or a radical or moiety derived from the end capping or chain transfer agent selected to terminate the polymerization or a silyl group and n represents an integer of from about 20 to about 10,000, preferably from about 40 to about 1000.

The polyphosphazenes of the present invention which are illustrated in the Examples given herein may be characterized by molecular weights of from about 5000 to about 2.5 million gms/mol, preferably from about 10,000 to about 250,000 gms/mol most preferably from about 20,000 to about 200,000 gms/mol as determined by gel permeation chromatography using polystyrene standards. This technique for measuring molecular weight of polyphosphazenes is well known in the art and is disclosed, for example, in Neilson et al, *Macromolecules*, Volume 20, 910–916 (1987). The polyphosphazenes of the type prepared in the Examples given herein melt to the point that they begin to flow easily at temperatures ranging from about 60° to about 70° C. These polyphosphazenes were not, however, completely isotropic until they were subjected to temperatures of from about 150° to about 200° C. This melting point characteristic makes these compounds particularly suitable for processing in the molten form. These polyphosphazenes may also be characterized by glass transition temperatures within the range of from about $-70°$ to about $-50°$ C. but such transition temperature is often difficult, if not possible, to detect. In fact, the glass transition temperature for the polyphosphazene produced in Example 3 below could not be detected. Such a subtle or indetectable glass transition temperature is indicative of a high degree of crystallinity and a more regular linear chain structure with little or no chain branching. The polyphosphazenes of the present invention are thermally stable, flame resistant, resistant to hostile environments and have anti-stick properties.

Mujumdar, et al., Macromolecules 1990, 23, 14–21, has reported an $M_w/M_n$ ratio of 1.17 for a sample of poly[bis(trifluoroethoxy)phosphazene] that was prepared by the nucleophilic substitution of polydichlorophosphazene in accordance with the polymer substitution method described therein. Neilson, et al., have reported $M_w/M_n$ ratios of about 2 for the polyalkyl/aryl phosphazenes prepared by the uncatalyzed condensation of the P-substituted-N-silylated phosphinimines in Chemical Reviews 1988, 88, 541–562. As is shown in Example 2 below, the catalyzed polymerization of the P-trisubstituted-N-silylated phosphinimine monomer in accordance with the present invention yields a product having an $M_w/M_n$ ratio of less than 2, preferably of from about 1.1 to 2.0 which is indicative of a more monodisperse polymer product. Thus, this invention provides a novel and relatively rapid polymerization process for the production of a novel form of this polyphosphazene polymer.

The characteristics of the polyphosphazenes of the present invention make them particularly suitable for use in automotive, aircraft, and semiconductor applications. More specifically, the polyphosphazenes of the present invention may be used to make seals for motors, O-rings, gaskets, connectors for oil rigs and oil pumping apparatus, pipe coupling and expansion joints for engines and machines of all types in accordance with techniques known to those skilled in the art.

The polyphosphazenes of the present invention are particularly advantageous from a processing standpoint because of the lower temperatures required to produce them and the relatively short polymerization times necessary to achieve very high monomer to polymer conversion. The process of the present invention also makes it possible to control the molecular weight and physical properties of the polymer product.

Having thus described our invention, the following Examples are given as being illustrative thereof. All percentages given in these Examples are percentages by weight, unless otherwise indicated.

EXAMPLES

Example 1

P-tris(2,2,2-trifluoroethoxy)-N-(trimethylsilyl) phosphinimine was prepared by the following procedure. The reaction vessel employed was a 300 ml round bottomed 3-necked flask equipped with a magnetic stirrer, a water jacketed condenser, a Claisen tube with a 125 ml pressure equalizing addition funnel, septa and dry nitrogen inlet and outlet. All glass connections were sealed and wrapped with polytetrafluoroethylene tape.

0.39 mol of freshly distilled tris(trifluoroethyl)phosphite was added to the reaction vessel via the addition funnel. Freshly distilled trimethylsilylazide (0.39 mol) was slowly added dropwise at room temperature via the addition funnel. The contents of the reaction vessel were constantly agitated during the addition of the trimethylsilylazide. The reaction vessel was then heated by means of a hot oil bath positioned over a magnetic stir plate, At 120° C., a vigorous stream of bubbles evolved in the reaction vessel, The reaction mixture was then refluxed for 24 hours in the reaction vessel which had been covered with aluminum foil to exclude light. The mixture in the reaction vessel was then cooled to 0° C.

0.39 mol of trimethylsilylazide was then added dropwise with stirring to the cooled mixture. The contents of the reaction vessel were constantly agitated during the addition of the azide. Upon completion of the addition, the contents of the reaction vessel were again heated and refluxed in the hot oil bath for 24 hours, The contents of the reaction vessel were stirred constantly during this second heating period. The contents of the reaction vessel were again cooled to 0° C. 0.44 mol of trimethylsilylazide was added to the cooled mixture dropwise with stirring. The contents of the reaction vessel were again heated by using a hot oil bath at 120° C. for 24 hours.

The reaction product thus obtained was a clear amber liquid which was distilled under reduced pressure. Two clear, colorless fractions were obtained as a result of this distillation. $^1$H NMR confirmed that Fraction I (40°–50° C./85 torr) was unreacted trimethylsilylazide and that Fraction 2 was the monomer P-tris-(trifluoroethoxy)-N-(trimethylsilyl)phosphinimine (a single peak at 0.1 ppm and a multiplet at 4.2 ppm). After a single vacuum distillation at 57° C./0.5 torr, the purity of the monomer was estimated from the NMR spectrum at about 98%. 7.8 grams of this phosphinimine were then combined with 180 μl of a 1 mol per liter solution of tetra-n-butylammonium fluoride in tetrahydrofuran in a sealed flask equipped with water-jacketed condenser under a dry nitrogen purge and maintained at a temperature of about 95° C. for about 1.5 hours. The clear reaction mixture was allowed to cool and a white solid formed. The solid was dissolved in tetrahydrofuran and the resultant solution was added to excess cold CHCl$_3$. A white precipitate formed immediately. A white powder was recovered by vacuum filtration in a yield of about 45%. GPC (gel permeation chromatography) data based on polystyrene standards indicated a peak molecular weight of about 11,000. The Fourier Transform Infrared spectrum included the broad absorption band at 1271 cm$^{-1}$ which is characteristic of the P=N backbone. $^{31}$P NMR showed a broad peak at −9.1 ppm and the H NMR spectrum displayed a broad peak at 4.6 ppm. One possible reaction mechanism for this polymerization is illustrated by the following reaction schemes:

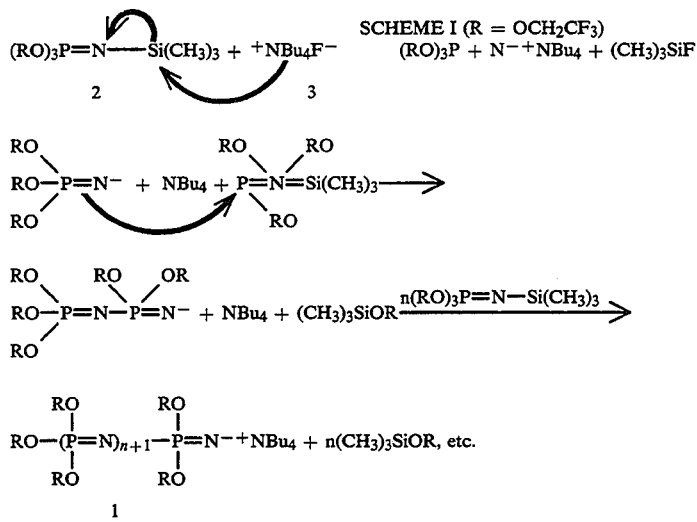

The glass transition temperature, melting points and decomposition temperature for this polymer are given in Table 1.

The product, poly[bis(2,2,2-trifluoroethoxy)phosphazene] contains the repeating unit represented by the formula:

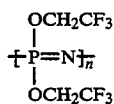

in which n is approximately 45.

Example 2

Figure 2:
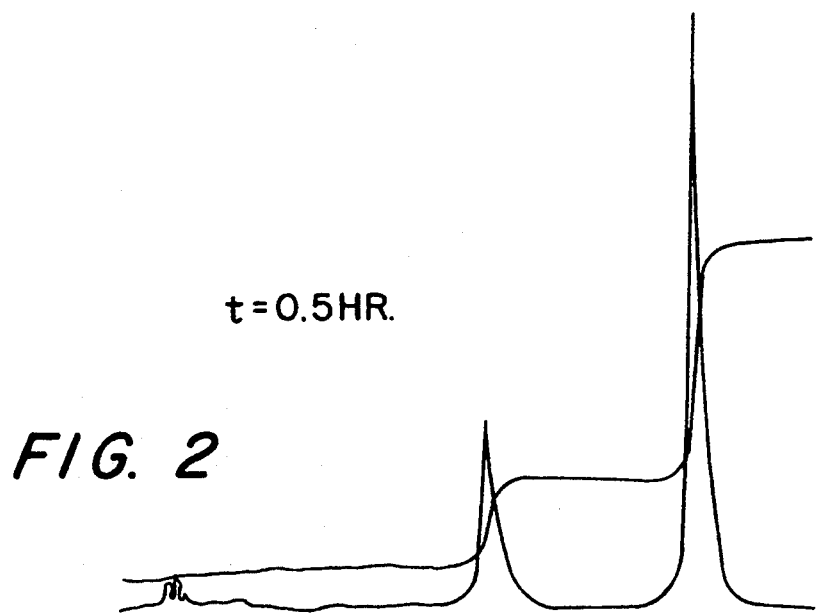
Figure 3:
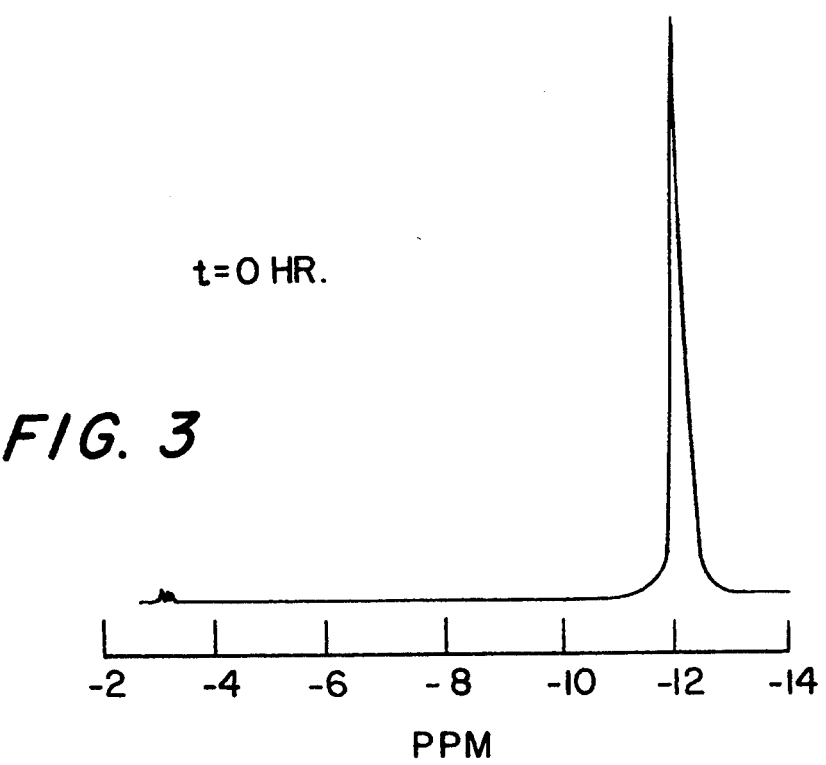

The procedure of Example 1 was repeated with the exception that the polymerization was carried out at 125° C. in the presence of diethylene glycol dimethyl ether for 4 hours. The progress of the polymerization was monitored by taking samples at the start of the reaction, after 0.5 hours and after 4.0 hours. These samples were analyzed by $^{31}$P NMR spectra. FIG. 1 is the spectrum of the sample taken at start. FIG. 2 is the spectrum of the sample taken after 0.5 hours. FIG. 3 is the spectrum of the sample taken after 4.0 hours. After 0.5 hours, approximately 25% of the monomer had been converted and after 4.0 hours, approximately 100% of the monomer had been converted. GPC measurement indicated a peak molecular weight of about 23,000 and a $M_w/M_n$ ratio of 1.52. The glass transition temperature, melting points and decomposition temperature for this polymer are reported in Table 1.

Examples 3-4

The procedure of Example 1 was repeated with the exception that the reaction temperature used in Example 3 was 125° C. and the temperature used in Example 4 was 150° C. The molecular weight, melting points, glass transition temperatures and decomposition temperatures for each of the polymers produced are given in Table 1 below.

TABLE I

| EXAMPLE | MOL WT[1] (gms/mole) | $T_g$ (°C.)[2] | $T_{m1}$ (°C.)[3] | $T_{m2}$ (°C.)[4] | Td (°C.)[5] |
|---|---|---|---|---|---|
| 1 | 11,000 | −59 | 69 | 193 | 280 |
| 2 | 23,000 | −62 | 64 | 158 | 279 |
| 3 | 52,000 | — | 68 | 173 | 275 |
| 4 | 100,000 | −59 | 69 | 193 | 280 |
| Prior Art[6] | | −66 | 89.5 | 241 | 242 |

[1]Molecular weight was determined by GPC using polystyrene standards in accordance with standard techniques such as those described by Neilson et al, Macromolecules, Volume 20, pages 910–916 (1987).
[2]Tg determined upon heating at 20° C./min.
[3]$T_{m1}$ is the temperature at which the polymer went from the crystalline state to the liquid crystalline state as determined upon heating at 20° C./min.
[4]$T_{m2}$ is the temperature at which the polymer went from the liquid crystalline state to the isotropic state as determined upon heating at 20° C./min.
[5]Td determined as 1% by weight loss at 20° C./min.
[6]Ciora, et al, "A Study of the Isothermal Crystallization Kinetics of Polyphosphazene Polymers. 2. Poly[bis(trifluoroethoxy)phosphazene]", Macromolecules, Vol. 23 No. 8, April 16, 1990.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyphosphazene produced by polymerizing a P-tris(fluoroalkoxy)-N-(silylated) phosphinimine monomer in the presence of a compound capable of cleaving the silyl group of the P-trifluoroalkoxy-N-silylated phosphinimine monomer and of producing a counterion capable of stabilizing the active ends of the monomer and growing chain.

2. The polyphosphazene of claim 1 in which the phosphinimine monomer is a P-tris(fluoroalkoxy)-N-(trialkyl-silylated)phosphinimine.

3. The polyphosphazene of claim 1 in which the phosphinimine monomer is a P-tris(trifluoroalkoxy)-N-(trialkyl-silylated)phosphinimine.

4. The polyphosphazene of claim 1 in which the phosphinimine monomer is a P-tris(2,2,2-trifluoroethoxy)-N-(trialkylsilylated)phosphinimine.

5. The polyphosphazene of claim 1 in which the phosphinimine monomer is a P-tris(trifluoroalkoxy)-N-(trimethylsilyl)phosphinimine.

6. The polyphosphazene of claim 1 in which the phosphinimine monomer is P-tris(2,2,2-trifluoroethoxy)-N-(trimethylsilyl)phosphinimine.

7. The polyphosphazene of claim 6 produced by polymerization at a temperature of from approximately 100° C. to approximately 150° C.

8. The polyphosphazene of claim 4 produced by polymerization at a temperature of from approximately 100° C. to approximately 150° C.

9. The polyphosphazene of claim 2 produced by polymerization at a temperature of from approximately 100° C. to approximately 150° C.

10. The polyphosphazene of claim 1 produced by polymerization at a temperature of from approximately 100° C. to approximately 150° C.

11. The polyphosphazene of claim 1 produced by polymerization at a temperature of approximately 125° C.

12. The polyphosphazene of claim 2 produced by polymerization at a temperature of approximately 125° C.

13. The polyphosphazene of claim 1 having either no determinable glass transition temperature or a poorly defined glass transition temperature within the range of from about −70° to −50° C.

14. A polyphosphazene corresponding to the formula

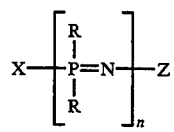

in which
X represents a fluoroalkoxy group or an end group of a chain transfer agent,
R represents a fluoroalkoxy group,
Z represents the counterion of a compound capable of cleaving a silyl group of a silylated phosphinimine and of stabilizing the active ends of the monomer and growing chain, a moiety derived from an end capping agent or chain transfer agent, or a radical derived from an end capping agent or chain transfer agent or a silyl group and
n represents an integer of from about 20 to about 10,000.

15. The polyphosphazene of claim 14 in which each R represents the same fluoroalkoxy group.

16. The polyphosphazene of claim 15 in which n represents an integer of from about 40 to about 1000.

17. The polyphosphazene of claim 15 in which R represents a fluoroethoxy group.

18. The polyphosphazene of claim 14 having a molecular weight of from about 5000 to about 2.5 million gms/mol as determined by gel permeation chromatography.

19. The polyphosphazene of claim 14 having a molecular weight of from about 10,000 to about 250,000 gms/mol as determined by gel permeation chromatography.

20. The polyphosphazene of claim 14 with a very high degree of crystallinity as evidenced by an indeterminable glass transition temperature or a poorly defined glass transition temperature within the range of from about −70° to −50° C.

* * * * *